United States Patent
Sawada et al.

(10) Patent No.: US 8,641,264 B2
(45) Date of Patent: Feb. 4, 2014

(54) PAINT PRODUCING METHOD AND PAINT PRODUCING SYSTEM

(75) Inventors: Hidenori Sawada, Kanagawa (JP); Masahiko Hiraki, Kanagawa (JP)

(73) Assignee: Kansai Paint Co., Ltd., Hyogo (JP)

( * ) Notice: Subject to any disclaimer, the term of this patent is extended or adjusted under 35 U.S.C. 154(b) by 1355 days.

(21) Appl. No.: 11/719,132

(22) PCT Filed: Nov. 10, 2005

(86) PCT No.: PCT/JP2005/020617
§ 371 (c)(1),
(2), (4) Date: May 11, 2007

(87) PCT Pub. No.: WO2006/054478
PCT Pub. Date: May 26, 2006

(65) Prior Publication Data
US 2009/0097352 A1    Apr. 16, 2009

(30) Foreign Application Priority Data

Nov. 18, 2004 (JP) .................................. 2004-334448
Jan. 6, 2005 (JP) .................................. 2005-001570

(51) Int. Cl.
*B01F 5/06* (2006.01)
*B01F 5/10* (2006.01)

(52) U.S. Cl.
USPC ............ 366/137; 366/336; 366/348; 366/605

(58) Field of Classification Search
USPC .............. 366/136, 137, 181.5, 340, 336, 337, 366/348, 605
See application file for complete search history.

(56) References Cited

U.S. PATENT DOCUMENTS

| 162,248 | A | * | 4/1875 | Miller | 366/137 |
| 167,837 | A | * | 9/1875 | Hunt | 34/171 |
| 895,795 | A | * | 8/1908 | Sampson | 366/107 |

(Continued)

FOREIGN PATENT DOCUMENTS

| DE | 23 37 984 A1 | 2/1975 |
| DE | 42 35 979 A1 | 4/1994 |

(Continued)

OTHER PUBLICATIONS

International Search Report from PCT/JP2005/020617 dated Feb. 14, 2006.

(Continued)

*Primary Examiner* — Tony G Soohoo
(74) *Attorney, Agent, or Firm* — Knobbe Martens Olson & Bear LLP

(57) ABSTRACT

The present invention provides a method for producing paint and a system for producing paint, which enable, in a paint-producing process, moderate stirring and dispersive mixing without causing entrainment of air bubbles, and are also economically advantageous and easier to clean. The system includes a tank 2 for receiving a paint material to be mixed and dispersed, a pump 3 for sucking part of the paint material in the tank 2 and discharging the sucked paint material into the remaining part of the paint material in the tank 2, and a flow path reduction area 5 disposed between the pump 3 and a paint material discharge outlet 4, the discharge outlet 4 being positioned so as to be submerged in the paint material in the tank. This achieves the stirring, mixing, and dispersion.

14 Claims, 5 Drawing Sheets

(56) References Cited

U.S. PATENT DOCUMENTS

| | | | | |
|---|---|---|---|---|
| 923,571 | A | * | 6/1909 | Paterson ............... 366/137 |
| 981,098 | A | * | 1/1911 | McCaskell ............ 422/224 |
| 1,438,733 | A | * | 12/1922 | Werner ................ 366/137 |
| 1,781,435 | A | * | 11/1930 | Carper ................ 241/97 |
| 2,365,293 | A | * | 12/1944 | Robinson ............. 210/125 |
| 2,516,884 | A | * | 8/1950 | Kyame ................ 127/28 |
| 2,692,798 | A | * | 10/1954 | Hicks ................. 137/115.06 |
| 2,815,532 | A | * | 12/1957 | Braunlich ............ 366/336 |
| 2,831,754 | A | * | 4/1958 | Manka ................ 366/338 |
| 2,860,857 | A | * | 11/1958 | Brown ................ 366/137 |
| 2,997,373 | A | * | 8/1961 | Stephens ............. 366/137 |
| 3,385,199 | A | * | 5/1968 | Smith, Jr. ............ 99/483 |
| 3,661,364 | A | * | 5/1972 | Lage ................. 366/136 |
| 4,148,101 | A | | 4/1979 | Einhorn |
| 4,165,186 | A | | 8/1979 | Tortorich et al. |
| 4,347,004 | A | * | 8/1982 | Platts ................ 366/137 |
| 4,403,866 | A | * | 9/1983 | Falcoff et al. ........ 366/132 |
| 4,647,212 | A | * | 3/1987 | Hankison ............ 366/165.5 |
| 4,660,988 | A | | 4/1987 | Hara et al. |
| 5,009,367 | A | * | 4/1991 | Nielsen .............. 239/3 |
| 5,050,995 | A | * | 9/1991 | Lucore, II ........... 366/136 |
| 5,197,800 | A | * | 3/1993 | Saidman et al. ...... 366/136 |
| 5,253,937 | A | * | 10/1993 | Scheimann et al. ... 366/136 |
| 5,304,001 | A | * | 4/1994 | Kuo et al. ........... 366/132 |
| 5,304,390 | A | * | 4/1994 | Condron et al. ...... 427/8 |
| 5,309,403 | A | * | 5/1994 | Bartow .............. 366/136 |
| 5,374,119 | A | * | 12/1994 | Scheimann .......... 366/101 |
| 5,590,960 | A | * | 1/1997 | Clinton et al. ....... 366/134 |
| 5,865,537 | A | * | 2/1999 | Streiff et al. ........ 366/174.1 |
| 6,290,385 | B1 | * | 9/2001 | Johansson ........... 366/137 |
| 6,379,035 | B1 | * | 4/2002 | Kubo et al. ......... 366/340 |
| 6,447,158 | B1 | * | 9/2002 | Farkas .............. 366/316 |
| 6,494,608 | B1 | * | 12/2002 | Retamal et al. ...... 366/132 |
| 2003/0137895 | A1 | * | 7/2003 | Hummer ............ 366/137 |

FOREIGN PATENT DOCUMENTS

| | | | | |
|---|---|---|---|---|
| EP | 1 036 588 | A | | 9/2000 |
| JP | 50-35755 | | | 4/1975 |
| JP | 50-45367 | | | 4/1975 |
| JP | 56 168829 | A | | 12/1981 |
| JP | 57-42324 | | | 3/1982 |
| JP | 61-64331 | U | | 5/1986 |
| JP | 61171527 | A | * | 8/1986 ........... B01F 5/10 |
| JP | 01 284327 | A | | 11/1989 |
| JP | 2-303529 | | | 12/1990 |
| JP | 05 317672 | A | | 12/1993 |
| JP | 6-7659 | | | 1/1994 |
| JP | 2000-210547 | | | 8/2000 |
| JP | 2000-254469 | | | 9/2000 |
| JP | 2002-143662 | | | 5/2002 |

OTHER PUBLICATIONS

European Search Report from Application No. EP 05 80 6237 dated Apr. 24, 2008.

* cited by examiner

PAINT PRODUCING METHOD AND PAINT PRODUCING SYSTEM

CROSS REFERENCE TO RELATED APPLICATIONS

This application claims to benefit and priority to and is a U.S. National Phase of PCT International Application Number PCT/JP2005/020617, filed on Nov. 10, 2005, designating the United States of America, which claims priority under U.S.C. §119 to Japanese Application 2004-334448 filed on Nov. 18, 2004 and to Japanese Application 2005-001570 filed on Jan. 6, 2005. The disclosures of the above-referenced applications are hereby incorporated by this reference in their entirety.

TECHNICAL FIELD

The present invention relates to a method for producing paint and a system for producing paint.

BACKGROUND ART

In conventional paint production, for producing water paints or paints that contain poorly compatible additives, paddle-blade agitators and high-speed dissolvers (also called dispersers) are often used because of their high shear force. However, paddle-blade agitators and high-speed dissolvers are problematic in that when the number of rotations of the paddle blades or dissolver vanes is increased, entrainment of air bubbles is caused due to a vortex, and, on the other hand, when processing at a reduced number of rotations, it is difficult to obtain the shear force necessary to disperse pigments for water paint or poorly compatible additives in a paint medium. For this reason, in such paint-producing processes where dispersion is difficult, homomixers, i.e., rotor/stator-type homogenizers, which cause less air bubble entrainment are used in place of high-speed dissolvers, etc. (see, e.g., patent document 1).

Patent document 1: Japanese Unexamined Patent Publication No. 1982-42324

DISCLOSURE OF THE INVENTION

Problems to be Solved by the Invention

Replacing a high-speed dissolver or the like with a homomixer increases costs, such as for changing the incidental electrical facilities. Moreover, homomixers are problematic in that they are difficult to clean.

The present invention aims to provide a method for producing paint and a system for producing paint, which enable high dispersibility without causing entrainment of air bubbles, and are also economically advantageous and make it easier to clean the implementing equipment.

Means for Solving the Problems

To achieve the above object, the method for producing paint of the present invention includes charging into a tank a liquid paint material to be mixed and dispersed; sucking part of the paint material in the tank with a pump; and, with the pump, passing the sucked paint material through a flow path reduction area and then discharging the same from a discharge outlet submerged in the remaining part of the paint material in the tank, thereby performing agitation, mixing, and dispersion.

The pump is preferably located outside the tank, so that the paint material in the tank is circulated through the pump between an external flow path and the tank.

Otherwise, it is also preferable that the pump be submerged in the paint material in the tank.

The average flow velocity in the flow path reduction area is preferably 5 to 100 m/s.

The paint material is preferably a water-paint material or an oil-paint material.

It is preferable that the flow path reduction area have nozzle plates that each have a plurality of nozzle holes and are arranged in a direction from the upstream side to the downstream side of the paint material flow, with the nozzle holes of adjacent nozzle plates being in such a form that a plurality of nozzle holes on the downstream side partially face one nozzle hole on the upstream side.

The plurality of nozzle plates that each have a plurality of nozzle holes are preferably joined from the upstream side to the downstream side of the paint material flow, or instead arranged at predetermined intervals with spacers from the upstream side to the downstream side of the paint material flow.

Each nozzle plate preferably has sharpened ridges at the paint material inflow side ends between adjacent nozzle holes.

Further, to achieve the above object, the system for producing paint of the present invention includes a tank for receiving a paint material to be mixed and dispersed, a pump for sucking part of the paint material in the tank and discharging the sucked paint raw material into the remaining part of the paint material in the tank, and a flow path reduction area disposed between the pump and a paint material discharge outlet, the discharge outlet being positioned so as to be submerged in the paint material in the tank.

It is preferable that the pump be located outside the tank, with a suction inlet of the pump being connected to an outlet of the tank by a pipe, a discharge outlet of the pump being connected with a circulation pipe, the end of the circulation pipe providing the paint material discharge outlet, and the flow path reduction area be disposed at the end of or midway along the circulation pipe.

Otherwise, the pump is preferably a submersible pump and positioned inside the tank.

The flow path reduction area may be formed of a plurality of orifices.

The minimum pore diameter at the flow path reduction area is preferably 0.3 to 30 mm.

Effect of the Invention

According to the present invention, an assemblage of a pump, a flow path reduction area, and a pipe, which are comparatively cheap devices, provides the dispersibility equal or superior to expensive conventional equipment. Moreover, cleaning can be easily performed by simply flowing a cleaning fluid through the pump into the nozzle and the pipe.

EXPLANATION OF REFERENCE NUMERALS

Figure 1:
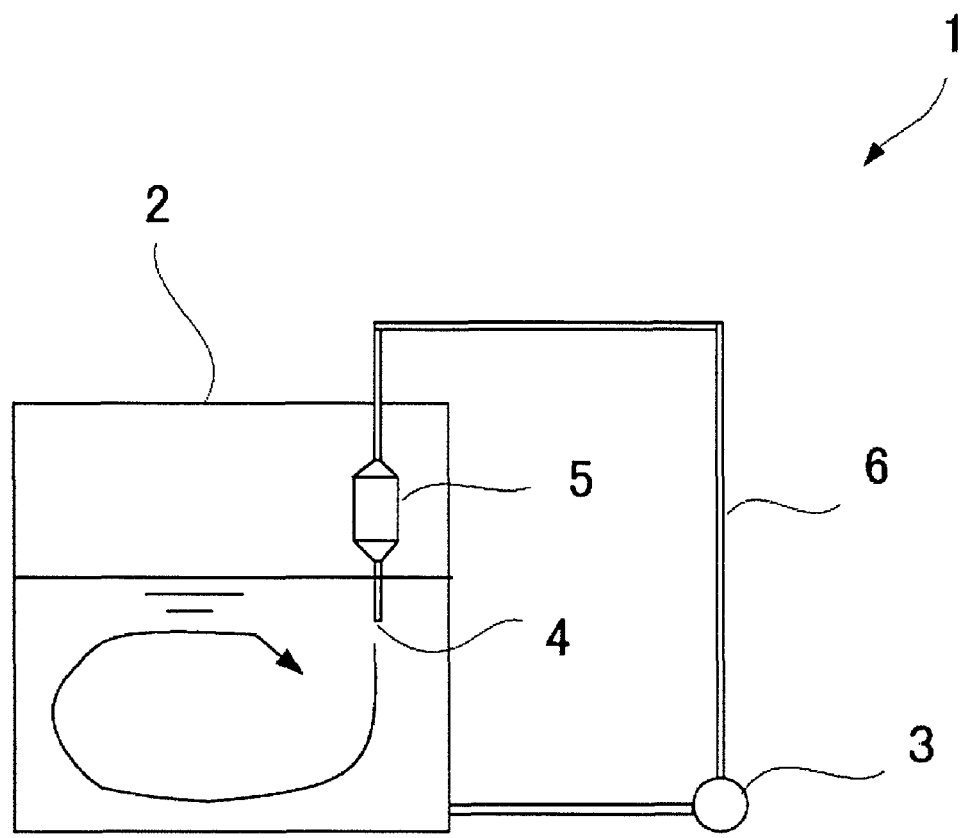
FIG. 1 is a system chart schematically showing a preferable embodiment of the system for producing paint according to the present invention.

1 System for producing paint
2 Tank
3 Pump
4 Discharge outlet
5 Flow path reduction area
6 Circulation pipe
7 Nozzle hole
8 Nozzle plate
15 Sharpened ridge
16 Spacer

BEST MODE FOR CARRYING OUT THE INVENTION

Preferable embodiments of the present invention are described hereinafter with reference to FIGS. 1 to 5. In all of the figures, similar elements are indicated with the same reference numerals, and in the following descriptions, redundant explanations may be omitted.

FIG. 1 is a system chart schematically showing the system for producing paint, for implementing the method according to the present invention for producing paint.

A system for producing paint 1 has a tank 2 for receiving a paint material to be mixed and dispersed, a pump 3 for sucking part of the paint material in the tank 2 and discharging the sucked paint material through a circulation pipe 6 into the remaining part of the paint material in the tank 2, and a flow path reduction area 5 disposed between the pump 3 and a paint material discharge outlet 4. The discharge outlet 4 is positioned so as to be submerged in the paint material in the tank 2.

In the illustrated example, the pump 3 is located outside the tank 2, and a suction inlet of the pump 3 is connected to a discharge outlet 2a of the tank 2 by a pipe. A discharge outlet of the pump 3 is connected to a circulation pipe 6, and the end of the circulation pipe 6 is submerged in the paint material. Midway along the circulation pipe 6, a flow path reduction area 5 is disposed. The flow path reduction area 5 may also be disposed at the end portion of the circulation pipe 6. A diaphragm pump, for example, may be used as the pump 3.

Although not illustrated, in the case of water paints, the pump 3 may be a submersible pump and positioned inside the tank 2. In this case, for example, the flow path reduction area 5 may be connected to a discharge outlet of the submersible pump, and submerged in the water paint. For securing such a submersible pump, for example, the submersible pump may be provided with a support member (not illustrated) and secured by fixing the support member outside of tank 2. Alternatively, the submersible pump may be provided with suction cups or the like, and fixed in the tank 2 by suction.

Figure 2:
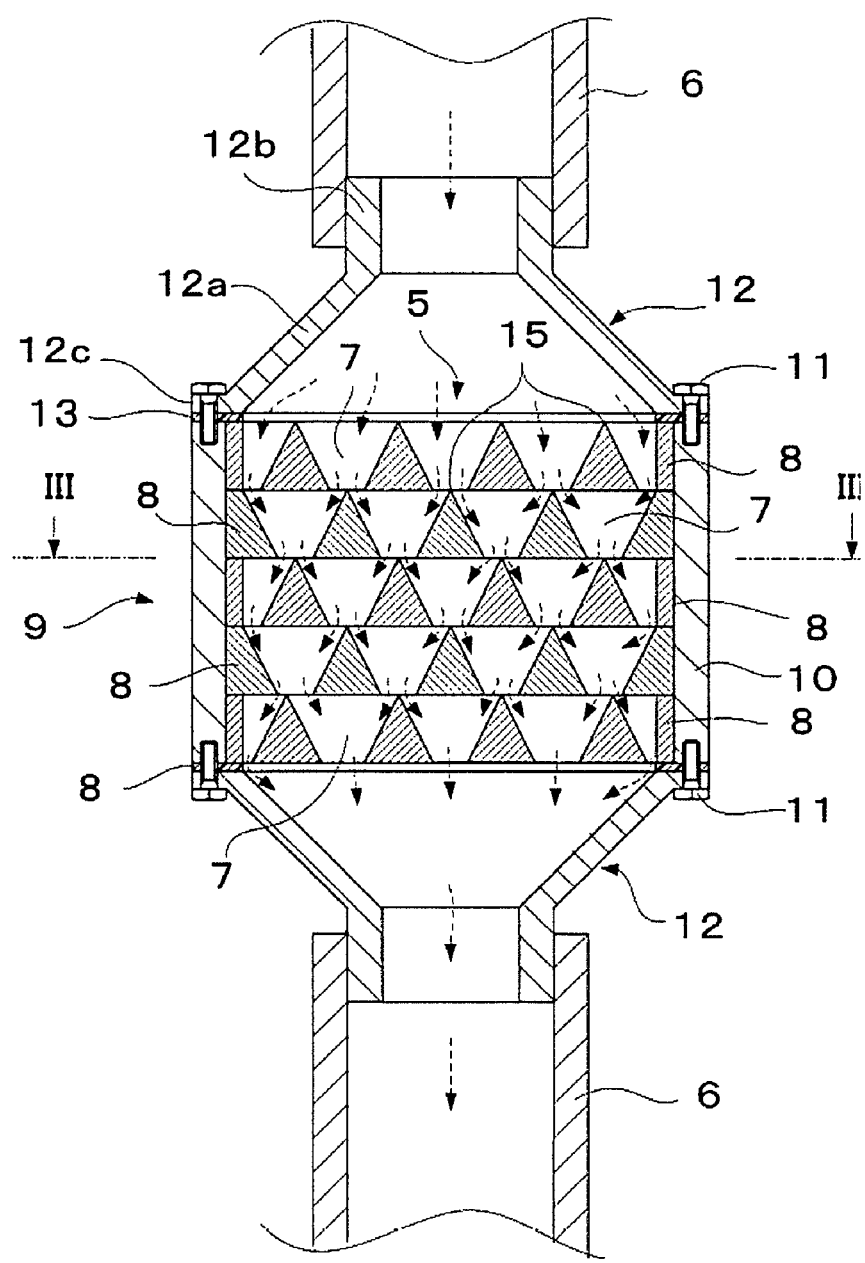
FIG. 2 is an enlarged sectional view of the flow path reduction area included in the system of FIG. 1.

As shown in FIG. 2, the flow path reduction area 5 is formed from a plurality of nozzle plates 8 that each have a plurality of nozzle holes 7 and are stacked in a direction from the upstream side to the downstream side of the paint material flow. The plurality of nozzle plates 8 are joined in such a manner that they will not separate from one another.

Figure 3:
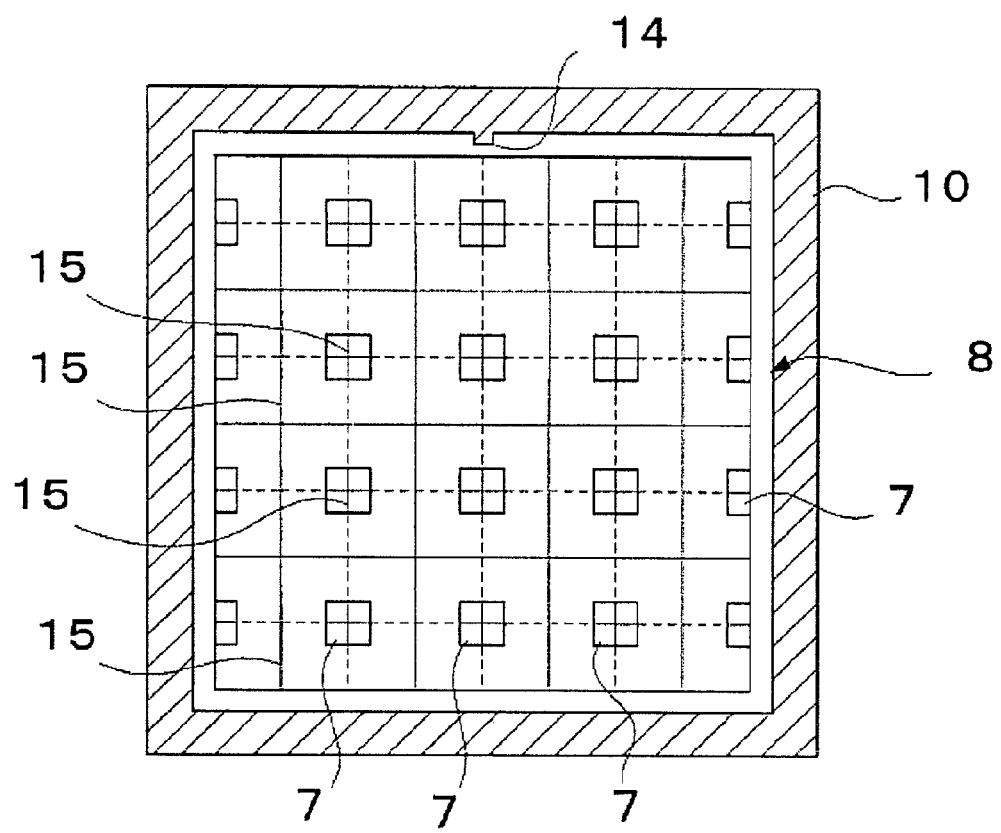
FIG. 3 is a III-III sectional view of the flow path reduction area of FIG. 2.

In the illustrated example, the nozzle plates 8 are accommodated in a casing 9 and thereby joined in such a manner that they do not separate apart. The casing 9 has a tubular portion 10 that accommodates the nozzle plates 8, and conical cover portions 12, 12 that are each secured to an opposite end of the tubular portion 10 with bolts 11. Each cover portion 12 has, at the end of a conical portion 12a, a flange 12b to be bolted to the tubular portion 10 and brought into contact with a nozzle plate 8; and a joint portion 12c for connecting the pipe 6 thereto. In FIG. 2, reference numeral 13 shows a seal packing, and dashed arrows show a paint flow. In FIG. 3, reference numeral 14 shows a projected positioning rim that extends on an inner circumferential wall of the tubular portion 10 in the length direction for positioning the nozzle plates 8.

When seen in a plane view, each nozzle plate 8 has a grid-like shape formed by regularly arranged nozzle holes 7 each having a rectangular cross-sectional shape in a plane view (see FIG. 3). In the illustrated example, the size of the nozzle holes 7 is the same in all of the nozzle plates 8, while the position of the nozzle holes 7 is different between adjacent nozzle plates 8, 8. As shown in FIGS. 2 and 3, the positioning is such that four nozzle holes 7 on the downstream side partially overlap and communicate with one nozzle hole 7 of the upstream side, and, in the axis direction of the nozzle that forms the flow path reduction area 5, the four nozzle holes 7 on the downstream side partially face one nozzle hole 7 on the upstream side. In the illustrated example, two kinds of nozzle plates 8 having different nozzle hole 7 positions are alternatively stacked and assembled.

In each nozzle plate 8, portions that partition adjacent nozzle holes 7, 7 have a triangular cross-sectional shape with the top on the inflow side, creating sharpened ridges 15. The sharpened ridges 15 give additional shear to the inflowing paint material. A sharpened ridge 15 does not necessarily have to be formed in the entire area between adjacent nozzle holes 7, 7, but is formed at least in a region facing the nozzle holes 7 on the upstream side. The cross-sectional shape of the portions that partition adjacent nozzle holes 7, 7 of the nozzle plates 8 is not limited to a triangle as in the illustrated example, and may be a hexagon (see FIG. 5), pentagon, quadrangle, or other polygon with the top on the inflow side. It may also be a trapezoid with the top on the inflow side.

The nozzle holes 7 may be convergent nozzle as in the illustrated example, and may also have a convergent and divergent nozzle or like known nozzle shape. The shape of the cross section perpendicular to the axis direction of the nozzle holes 7 is not limited to a rectangle as in the illustrated example, and circular, triangular, and like shapes may be employed.

Figure 4:
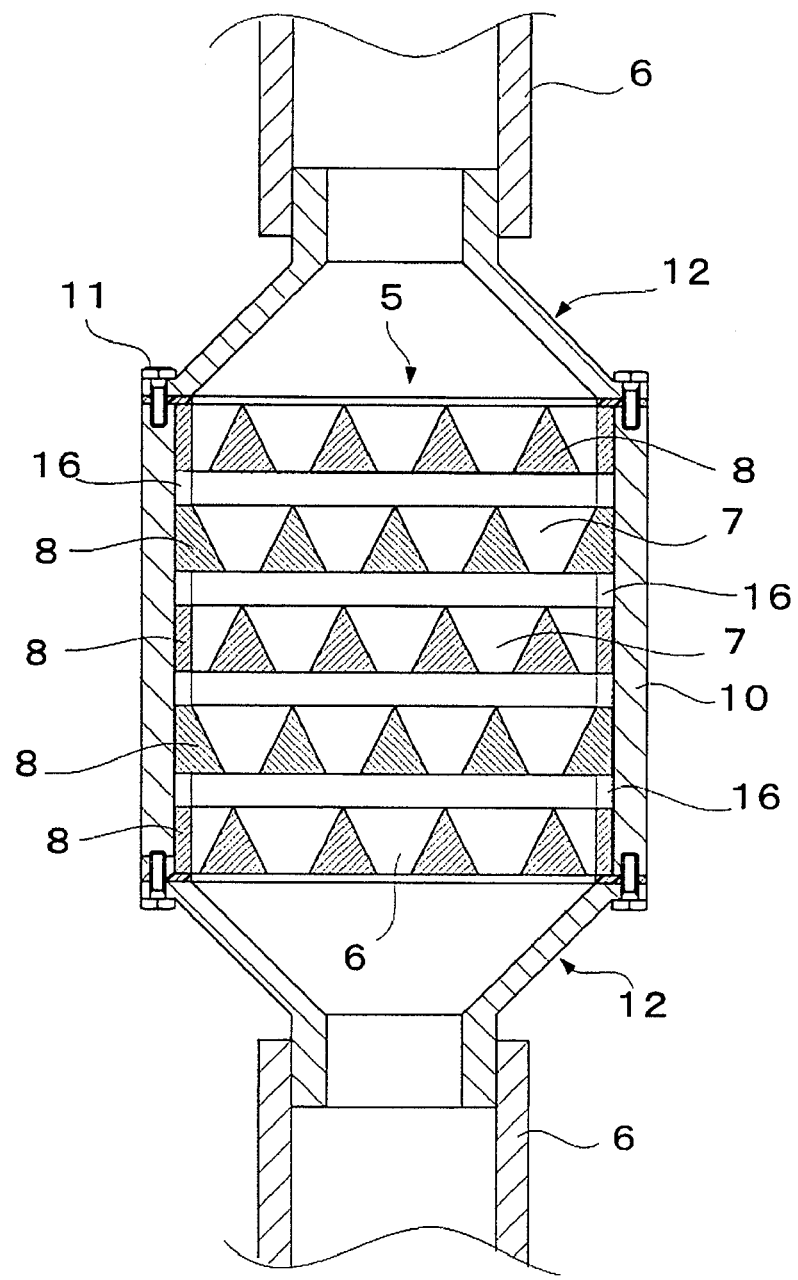
FIG. 4 is an enlarged sectional view of another embodiment of the flow path reduction area shown in FIG. 2.
Figure 5:
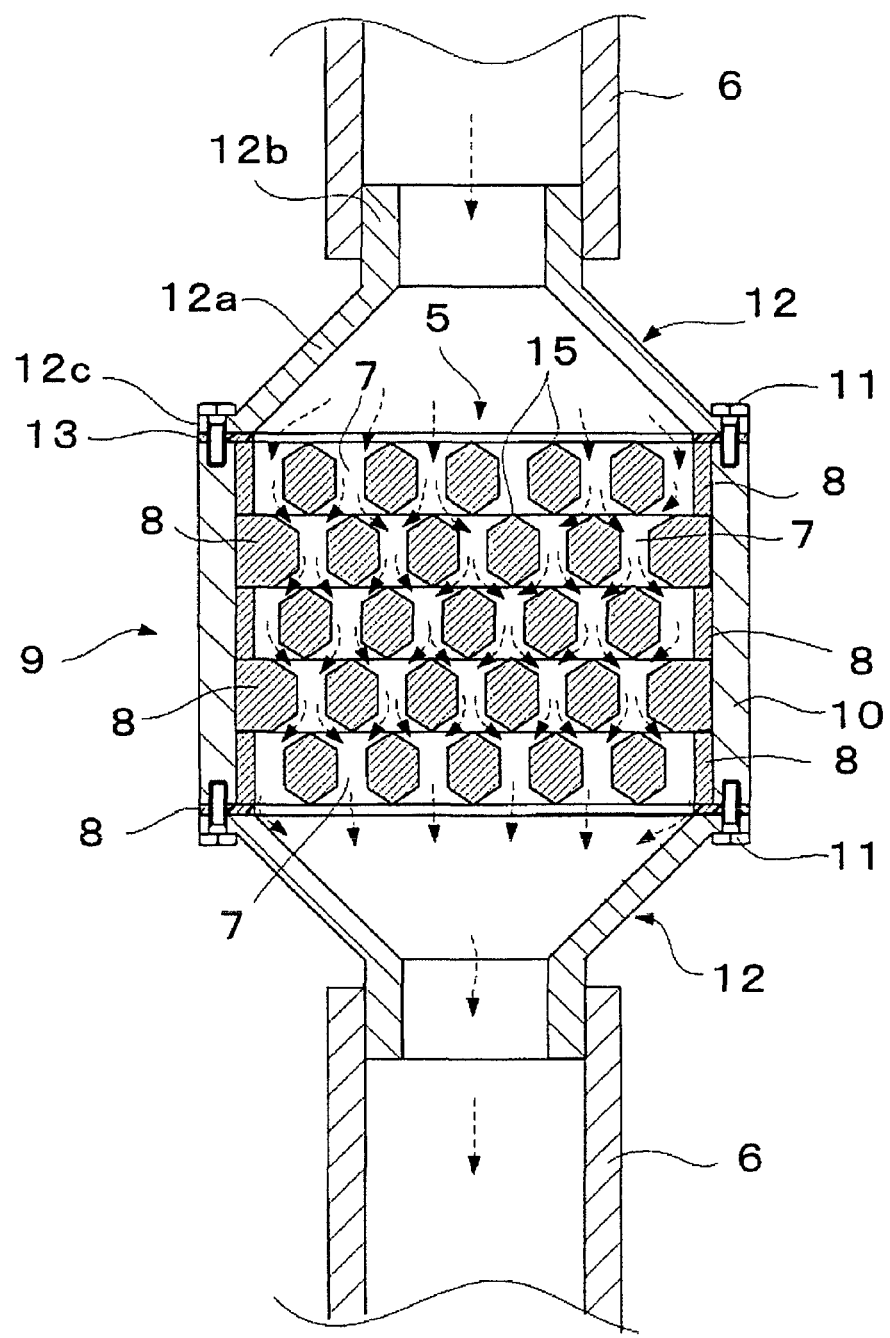
FIG. 5 is an enlarged sectional view of still another embodiment of the flow path reduction area shown in FIG. 2.

FIG. 4 is a longitudinal sectional view showing another embodiment of the nozzle forming the flow path reduction area. The embodiment shown in FIG. 4 is different from the above embodiment in that a circular spacer 16 is interposed between adjacent nozzle plates 8 to thereby provide a predetermined space between the nozzle plates 8, and is the same as the above embodiment in other respects.

Although the flow path reduction area 5 in the illustrated example is a nozzle, this is not limited and may also be an orifice or like item capable of narrowing the flow path and thereby accelerating the flow rate.

Hereinafter, an operating example of a system for producing paint 1 is explained.

First, a liquid paint material to be mixed and dispersed is charged into the tank 2. Examples of paint to be produced include water paints, oil paints, clear paints, etc. In the system for producing paint of the present invention, the paint material charged into the tank is particularly a material that has been pre-kneaded and pre-dispersed using a beads-mill, etc. The paint material is a mixture of a pigment paste with a solvent, an additive, etc. Pigment paste refers to a mixed paste having a relatively high viscosity, obtained by dispersing and mixing secondary particles, which are condensates of pigments, into primary particles in a resin or like vehicle. Solvent refers to water for water paints, and a vehicle for oil paints.

A predetermined amount of paint material is charged into the tank 2, and the pump 3 is then operated. Part of the paint material in the tank 2 is sucked with the pump 3, and pumped from the pump 3 to the circulation pipe 6. The paint material pumped in the circulation pipe 6 passes through a flow path reduction area 5 disposed midway along the circulation pipe 6, and then gushes out from a discharge outlet 4 of the circulation pipe 6 that is submerged in the remaining part of the paint material in the tank 2.

The gush of the paint material from the discharge outlet 4 causes a stirring flow in the tank 2, thereby stirring and dispersing pigments, additives, etc.

When the paint material successively passes through the nozzle holes 7 of each nozzle plate 8 at high speed, it is repeatedly compressed and expanded, thereby being subjected to shear. The paint material discharged from one nozzle hole 7 on the upstream side is divided and fed into a plurality of adjacent nozzle holes 7 on the downstream side, and this promotes uniform dispersion and atomization. Further, the paint material flowing into the nozzle that forms the flow path reduction area 5 strikes against the sharpened ridges 15, and this promotes shear. When the paint material gushes from the flow path reduction area 5 into the paint material liquid in the tank 2, it is subjected to shear due to the expansion of the paint material into the tank 2, the generation of a turbulent flow in the paint material, the collision of jet streams with the paint material in the tank 2, etc. This promotes atomization.

As in the embodiment shown in FIG. 4, when a spacer 16 is interposed between two nozzle plates 8, expansion occurs in the space formed by the spacer 16, which increases shear.

Circulation of the paint material (e.g., 1 kl) for a required time (e.g., 0.3 to 3 hours) in this way atomizes pigments, additives, etc., with an atomization capability that is higher than that of a homomixer (rotor/stator type homogenizer).

For such an atomization effect, the average flow velocity in the flow path reduction area 5 is an important factor. The flow velocity suitable for atomization is such that the flow velocity in the flow path reduction area 5 is no less than 2 m/s, and preferably no less than 5 m/s. Although a faster average flow velocity in the flow path reduction area 5 would be better, no more than 100 m/s is suitable considering the viscosity of the paint to be dispersed or prepared, pump properties, etc.

In order to obtain the flow velocity required for the above-described atomization effect within a range of paint material viscosity that is commonly processed (0.001 to 10 Pas), the minimum pore diameter at the flow path reduction area 5 (minimum pore diameter of nozzle holes 7) is preferably 0.3 to 30 mm.

If necessary, the tank 2 may have disposed therein paddle blades or like large-sized blades that rotate at a low speed which does not allow the air bubble entrainment due to a vortex.

An assemblage of a pump, a flow path reduction area, and a pipe, which are relatively inexpensive devices, enables the above system, which is capable of providing dispersibility equal or superior to expensive conventional products. Moreover, the system is enabled by simple assembly operations such as porting a suction inlet of the pump 3 to an outlet that the tank 2 normally has, then submerging in the tank the tip of a pipe connected to a discharge outlet of the pump, etc. Existing equipment as it is can thus be utilized. The above system is also advantageous in that cleaning is easy because it can be cleaned by simply flowing a cleaning fluid through the pump into the nozzle and pipe.

When a nozzle structured as in FIGS. 2 to 5 is used as a flow path reduction area, and a liquid paint material is circulated therethrough, excellent dispersibility can be achieved, and effective dispersion is possible even for the dispersion of water paints or paint materials that contain poorly compatible additives, which have heretofore been difficult to disperse.

INDUSTRIAL APPLICABILITY

The present invention is applicable to the field of paint production, particularly, for example, to the production of water paints or paints that contain poorly compatible additives, and also to paint preparation processes involving atomization and dispersive mixing of pigment pastes, additives, and the like in a paint solution.

The invention claimed is:

1. A method for producing paint, the method comprising:
charging into a tank a liquid paint material to be mixed and dispersed;
sucking part of the paint material in the tank with a pump; and,
with the pump, passing the sucked paint material through a flow path reduction area and then discharging the sucked paint material from a discharge outlet that is submerged in the remaining part of the paint material in the tank, thereby performing agitation, mixing, and dispersion,
wherein the flow path reduction area is configured to accelerate the flow rate by narrowing the flow path,
the sucked paint material is supplied to a fixed higher end of the flow path reduction area, discharged from a fixed lower end of the flow path reduction area, and then discharged from the discharge outlet,
the flow path reduction area comprises nozzle plates that each have a plurality of nozzle holes and are lined up from the upstream side to the downstream side of a paint material flow; and
nozzle holes of adjacent nozzle plates are formed so that a plurality of nozzle holes on the downstream side partially face one nozzle hole on the upstream side.

2. A method for producing paint according to claim 1, wherein:
the pump is located outside the tank, and
the paint material in the tank is circulated through the pump between an external flow path and the tank.

3. A method for producing paint according to claim 1, wherein the pump is submerged in the paint material in the tank.

4. A method for producing paint according to claim 1, wherein the average flow velocity in the flow path reduction area is 5 to 100 m/s.

5. A method for producing paint according to claim 1, wherein the paint material is a water-paint material.

6. A method for producing paint according to claim 1, wherein the paint material is an oil-paint material.

7. A method for producing paint according to claim 1, wherein the plurality of nozzle plates that each have a plurality of nozzle holes are joined from the upstream side to the downstream side of a paint material flow.

8. A method for producing paint according to claim 1, wherein the plurality of nozzle plates that each have a plurality of nozzle holes are lined up at predetermined intervals with spacers from the upstream side to the downstream side of a paint material flow.

9. The method of claim 8, wherein the nozzle plates are configured to accelerate the flow rate by narrowing the flow path and the spacers arc not configured to accelerate the flow rale by narrowing the flow path.

10. A method for producing paint according to claim 1, wherein each nozzle plate has sharpened ridges at edges between adjacent nozzle holes, on the paint material inflowing side.

11. A method for producing paint, the method comprising:
charging into a tank a liquid paint material to be mixed and dispersed;
sucking part of the paint material in the tank with a pump; and
with the pump, passing the sucked paint material through a flow path reduction area and then discharging the sucked paint material from a discharge outlet that is submerged in the remaining part of the paint material in the tank, thereby performing agitation, mixing, and dispersion,
wherein the flow path reduction area is configured to accelerate the flow rate by narrowing the path,
the sucked paint material is supplied to a fixed higher end of the flow path reduction area, discharged from a fixed lower end of the flow path reduction area, and then discharged from the discharge outlet, and
the flow path reduction area comprises:
a plurality of plates, wherein each of the plurality of plates has an upper face and a lower face and is configured to accelerate the flow rate by narrowing the flow path, and wherein the upper face of a first of the plurality of plates is spaced a non-zero predetermined distance from the lower face of a second of the plurality of plates adjacent to the first of the plurality of plates.

12. A method for producing paint, the method comprising:
charging into a tank a liquid paint material to be mixed and dispersed;
sucking part of the paint material in the tank with a pump; and
with the pump, passing the sucked paint material through a flow path reduction area and then discharging the sucked paint material from a discharge outlet that is submerged in the remaining part of the paint material in the tank, thereby performing agitation, mixing, and dispersion,
wherein the flow path reduction area is configured to accelerate the flow rate by narrowing the path,
the sucked paint material being supplied to a fixed higher end of the flow path reduction area, discharged from a fixed lower end of the flow path reduction area, and then discharged from the discharge outlet, and
the flow path reduction area further comprises:
a plurality of plates, wherein each of the plurality of plates has an upper face and a lower face and is configured to accelerate the flow rate by narrowing the flow path; and
a plurality of spacers, wherein each of the plurality of spacers is positioned between two of the plurality of plates and is not configured to accelerate the flow rate by narrowing the flow path.

13. A method for producing paint according to claim 12, wherein each of the plurality of spacers abuts the upper face of a first of the two of the plurality of plates and the lower face of a second of the two of the plurality of plates.

14. A method for producing paint according to claim 12, wherein each of the plurality of spacers has a circular outer surface and a circular inner surface.

* * * * *